(12) United States Patent
Kohara et al.

(10) Patent No.: US 6,277,923 B1
(45) Date of Patent: *Aug. 21, 2001

(54) CYCLOOLEFIN-BASED POLYMER AND PROCESS FOR PRODUCING THE SAME

(75) Inventors: Teiji Kohara, Kawasaki; Toshihide Murakami, Tokyo, both of (JP)

(73) Assignee: Nippon Zeon Co., LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 56 days.

(21) Appl. No.: 08/915,328

(22) Filed: Aug. 20, 1997

(30) Foreign Application Priority Data

Aug. 23, 1996 (JP) .................................... 8-241294

(51) Int. Cl.⁷ ....................................... C08F 8/00
(52) U.S. Cl. ..................... 525/332.1; 528/482; 528/502
(58) Field of Search .................. 525/332.1; 528/482.502

(56) References Cited

U.S. PATENT DOCUMENTS

| 4,981,591 | 1/1991 | Ostreicher . |
| 5,334,424 | 8/1994 | Hani et al. . |
| 5,462,995 | 10/1995 | Hosaka et al. . |
| 5,571,859 | 11/1996 | Yukishige et al. . |

FOREIGN PATENT DOCUMENTS

| 430 528 A2 | 6/1991 | (EP) . |
| 433 661 A2 | 6/1991 | (EP) . |
| 436 372 A2 | 7/1991 | (EP) . |
| WO 95/33786 | 12/1995 | (WO) . |

*Primary Examiner*—Bernard Lipman
(74) *Attorney, Agent, or Firm*—Armstrong, Westerman, Hattori, McLeland & Naughton, LLP

(57) ABSTRACT

The object of the present invention is to provide a cycloolefin-based polymer with very low content of foreign matters, a molded article obtained by using the cycloolefin-based polymer, and a process for producing the cycloolefin-based polymer. The present invention relates to a cycloolefin-based polymer which has an intrinsic viscosity [η] of 0.01–20 dl/g as determined in decalin at 80° C. and has a content of foreign matters having a particle diameter of 0.5 μm or more of $3\times10^4$ particles/g or less, a process for producing the cycloolefin-based polymer, and a molded material comprising the cycloolefin-based polymer and a molded article obtained therefrom.

16 Claims, No Drawings

CYCLOOLEFIN-BASED POLYMER AND PROCESS FOR PRODUCING THE SAME

BACKGROUND OF THE INVENTION

The present invention relates to a cycloolefin-based polymer with a very low content of foreign matters and to a molded article obtained by using the cycloolefin-based polymer. The invention also relates to a process for producing a cycloolefin-based polymer with a very low content of foreign matters.

An integrated circuit (IC) is an electronic circuit provided with a large number of transistors, resistances, capacitors, etc. on the surface of a silicon wafer several millimeters square. With recent increasing requirement for electronic instruments of more enhanced performance and smaller size, the degree of integration of the IC is becoming increasingly high, and the IC is developing through LSI to super LSI and VLSI (ultra LSI). In the LSI and super LSI, the necessary circuits are formed by printing the circuits on a silicon wafer by using a photosensitive resist or the like, and then successively applying the treatments of surface oxidation, etching by chemicals, doping, vapor deposition, supersonic cleaning, etc. With the increasingly high degree of integration of the IC, the width of the circuit is decreasing to as small as the order of submicron. Consequently, when impurities, particularly minute particles, are present on the silicon wafer surface, they will adversely influence on the withstand voltage characteristic of the oxide film of the LSI, and the extent of the influence is increasingly large as the degree of integration increases. Therefore, for example, an ultrapure water having a very low content of minute particulate foreign matters is used in the cleaning step.

However, the etching treatment with chemicals and the cleaning with ultrapure water, which are commonly conducted by placing the silicon wafer in a plastic case called a carrier and immersing it in an etching liquid or ultrapure water, have a problem in that minute particulate matters are generated from the carrier itself. Thus, these plastic cases have hitherto been made by using fluoresins, such as PFA, polypro-pylene or like resins, which are excellent in chemical resistance, but these resins have shortcomings in that they are apt to generate minute particulate foreign matters on contacting with the silicon wafer owing to their low surface hardness and that they do not give satisfactory dimensional accuracy and surface smoothness at the time of molding.

As a means for solving such problems, JP-A-7-126434 discloses a treating vessel for use in semiconductor production steps which uses a thermoplastic norbornene type resin. However, the vessel also shows the generation of minute particulate foreign matters at the time of ultrasonic cleaning, etc. and hence cannot be deemed fully satisfactory.

SUMMARY OF THE INVENTION

The object of the present invention is to provide a cycloolefin polymer with a very low content of foreign matters, a molded article obtained by using the cycloolefin-based polymer and a process for producing the cycloolefin-based polymer.

After extensive study for overcoming the problems of the prior art, the present inventors have found that a plastic case for a carrier which generates very little foreign matters even when used for chemical treatment and ultrasonic cleaning by using a cyclo-olefin-based polymer in which the content of foreign matters having a particle diameter of 0.5 μm or more has been reduced. Moreover, when the cycloolefin-based polymer used to prepare various molded articles by injection molding or other means, molded articles which are excellent in dimensional stability and dimensional accuracy and have a very smooth surface can be obtained. Accordingly, the use of the resin can be extended to those fields where a particularly high degree of surface smoothness is required. Such cycloolefin-based polymers with a very low content of minute foreign matters can be easily obtained, for example, by filtering the polymer in the state of solution through a filter which has a capturing function based on electric charges.

In the present invention, the "foreign matters" refer to impurities (contaminants), catalyst residues, gels and like substances which have got mingled in the polymer as minute particulate substances, fibrous substances, etc. without becoming compatible with the cycloolefin-containing polymer. The content of foreign matters having a particle diameter of 0.5 μm or more refers to the value determined with a 1.5% by weight toluene solution of the polymer by using a microparticle detector by light scattering method.

The present invention has been accomplished on the basis of these findings.

According to the present invention, there are provided:
a cycloolefin-based polymer which has a repeating unit represented by the formula (1) or the formula (2)

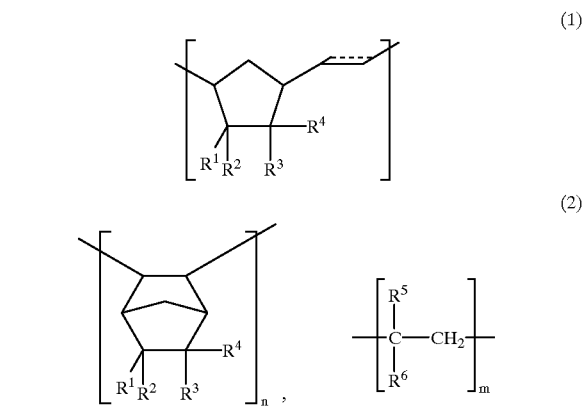

wherein
$R^1$–$R^4$ each independently represent a hydrogen atom, hydrocarbon group, halogen atom, hydroxy group, ester group, alkoxy group, cyano group, amido group, imido group or silyl group, or a hydrocarbon group substituted with a polar group (that is, halogen atom, hydroxy group, ester group, alkoxy group, cyano group, amido group, imido group or silyl group), provided that two or more of $R^1$–$R^4$ may combine with each other to form an unsaturated bond, single ring or multi-ring, the single ring or the multi-ring may have a double bond or may form an aromatic ring, and $R^1$ conjointly with $R^2$ or $R^3$ conjointly with $R^4$ may form an alkylidene group;
$R^5$ and $R^6$ each independently represent a hydrogen atom, alkyl group or aryl group;
the symbol - - - represents a carbon-carbon single bond or double bond; and
n and m are numbers specified by the mathematical expressions n+m=1, n=0.2–1 and m=0–0.8;
has an intrinsic viscosity [η] of 0.01–20 dl/g as determined in decalin at 80° C. and has a content of foreign matters having a particle diameter of 0.5 μm or more of $3\times10^4$ particles/g or less, a process for producing a cycloolefin-based polymer having an intrinsic viscosity [η] of 0.01–20 dl/g as determined in decalin at 80° C. and a content of foreign matters having a particle diameter of 0.5 μm or more of 3×10⁴ particles/g or less which comprises the step of filtering an organic solvent solution of a cycloolefin-based polymer having a repeating unit represented by the formula (1) or formula (2) through a filter which has a capturing function based on electric charges, a molding material which comprises a cycloolefin-based polymer having a repeating unit represented by the formula (1) or the formula (2), the cycloolefin-based polymer having an intrinsic viscosity [η] of 0.01–20 dl/g as determined in decalin at 80° C. and a content of foreign matters having a particle diameter of 0.5 μm or more of 3×10⁴ particles/g or less, and a molded article obtained by molding the molding material.

DETAILED DESCRIPTION OF THE INVENTION

Cycloolefin-Based Polymer

The cycloolefin-based polymer of the present invention is a polymer which has a repeating unit represented by the formula (1) or the formula (2)

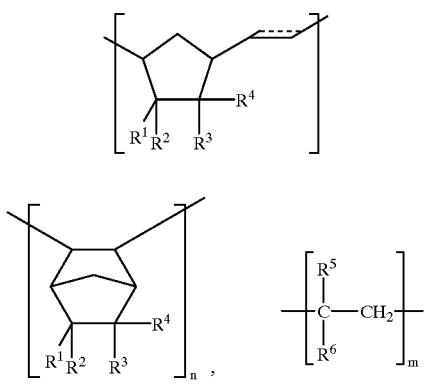

wherein $R^1$–$R^4$ each independently represent a hydrogen atom, hydrocarbon group, halogen atom, hydroxy group, ester group, alkoxy group, cyano group, amido group, imido group or silyl group, or a hydrocarbon group substituted with a polar group (that is, halogen atom, hydroxy group, ester group, alkoxy group, cyano group, amido group, imido group or silyl group), provided that two or more of $R^1$–$R^4$ may combine with each other to form an unsaturated bond, single ring or multi-ring, the single ring or the multi-ring may have a double bond or may form an aromatic ring, and $R^1$ conjointly with $R^2$ or $R^3$ conjointly with $R^4$ may form an alkylidene group;

$R^5$ and $R^6$ each independently represent a hydrogen atom, alkyl group or aryl group;

the symbol - - - represents a carbon-carbon single bond or double bond; and n and m are numbers specified by the mathematical expressions n+m=1, n=0.2–1 and m=0–0.8.

A preferred example of the cycloolefin-based polymer having the repeating unit (1) is a ring-opening polymer or copolymer of norbornene type monomers having a repeating unit represented by the formula (3)

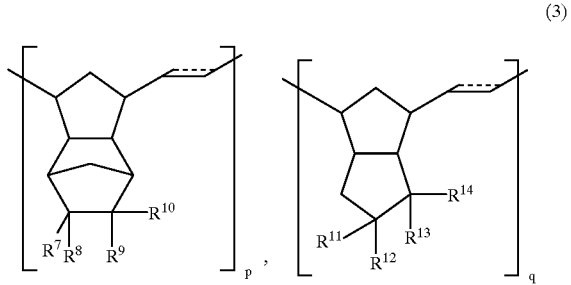

wherein $R^7$–$R^{10}$ each independently represent a hydrogen atom, hydrocarbon group, halogen atom, hydroxy group, ester group, alkoxy group, cyano group, amido group, imido group or silyl group, or a hydrocarbon group substituted with a polar group (that is, halogen atom, hydroxy group, ester group, alkoxy group, cyano group, amido group, imido group or silyl group), provided that two or more of $R^7$–$R^{10}$ may combine with each other to form an unsaturated bond, single ring or multi-ring, the single ring or the multi-ring may have a double bond or may form an aromatic ring, and $R^7$ conjointly with $R^8$ or $R^9$ conjointly with $R^{10}$ may form an alkylidene group; preferably $R^7$–$R^{10}$ each represent a hydrogen atom, $C_1$–$C_6$ alkyl group or $C_1$–$C_6$ alkylidene group, or two or more of $R^7$–$R^{10}$ combine with each other to form a cyclohexane ring, cyclopentane ring, norbornene ring or benzene ring;

$R^{11}$–$R^{14}$ respectively correspond to the aforesaid $R^7$–$R^{10}$ and have the same meanings as $R^7$–$R^{10}$;

p and q are numbers specified by the mathematical expressions p+q=1, p=0–1 and q=0–1; and the symbol - - - represents a carbon-carbon single bond or double bond.

A preferred example of a cycloolefin-based polymer having the repeating unit (2) is an addition polymer or copolymer of norbornene type monomers having a repeating unit represented by the formula (4)

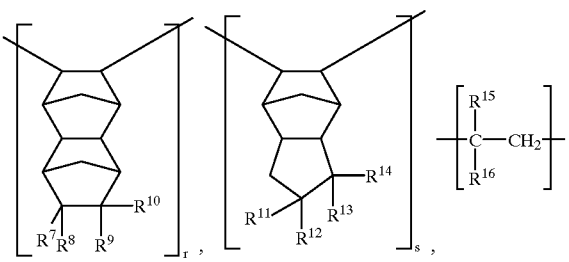

wherein $R^7$–$R^{10}$ each independently represent a hydrogen atom, hydrocarbon group, halogen atom, hydroxy group, ester group, alkoxy group, cyano group, amido group, imido group or silyl group, or a hydrocarbon group substituted with a polar group (that is, halogen atom, hydroxy group, ester group, alkoxy group, cyano group, amido group, imido group or silyl group); provided that two or more of $R^7$–$R^{10}$ may combine with each other to form an unsaturated bond, single ring or multi-ring, the single ring or the multi-ring may have a double bond or may form an aromatic ring, and $R^7$ conjointly with $R^8$ or $R^9$ conjointly with $R^{10}$ may form an alkylidene group; preferably, $R^7$–$R^{10}$ each represent a hydrogen atom, $C_1$–$C_6$ alkyl group or $C_1$–$C_6$ alkylidene group or two or more of $R^7$–$R^{10}$ combine with each other to form a cyclohexane ring, cyclopentane ring, norbornene ring or benzene ring;

$R^{11}$–$R^{14}$ respectively correspond to the aforesaid $R^7$–$R^{10}$ and have the same meanings as $R^7$–$R^{10}$;

r, s and t are numbers specified by the mathematical expressions r+s+t=1, r+s=0.2–1 (preferably 0.4–1, more preferably 0.7–1), t=0–0.8 (preferably 0–0.6, more preferably 0–0.3), r=0.2–1 and s=0.2–1; and $R^{15}$ and $R^{16}$ each independently represent a hydrogen atom, alkyl group or aryl group, preferably a hydrogen atom, $C_1$–$C_6$ alkyl group or $C_6$–$C_{10}$ aryl group, more preferably a hydrogen atom.

(A) Cycloolefin-based Polymer (i) Represented by the Formula (1)

Among the cycloolefin-based polymers of the present invention, the cycloolefin-based polymer (i) represented by the formula (1), preferably by the formula (3), may be obtained by subjecting at least one kind of cycloolefin monomer represented by the formula (5)

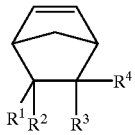

(5)

wherein $R^1$–$R^4$ are the same as defined for the formula (1), to ring-opening polymerization or copolymerization and, if necessary and desired, subjecting the resulting product to hydrogenation. The ring-opening polymer or copolymer has a carbon-carbon double bond (C=C) in the main chain. When the ring-opening polymer or copolymer is subjected to hydrogenation, the double bond in the main chain is hydrogenated to form a carbon-carbon single bond. In this instance, when the hydrogenation rate does not reach 100%, the carbon-carbon single bond and double bond come to exist together. The symbol --- represents all of the unhydrogenated product, hydrogenated product and partially hydrogenated product.

The carbon-carbon double bond of the main chain may be hydrogenated to a hydrogenation rate of 95% or more. When a non-conjugated carbon-carbon double bond is present in the side chain, they are also similarly hydrogenated at the time of hydrogenation of the double bond of the main chain. When an aromatic ring is present in the side chain, the carbon-carbon double bond of the main chain may be selectively hydrogenated to leave the aromatic ring unhydrogenated, or alteratively the carbon-carbon double bond of the main chain and the conjugated double bond of the aromatic ring may be simultaneously hydrogenated to saturate the aromatic ring also by hydrogenation.

(A-1) Cycloolefin Monomer

The cycloolefin monomer in the present invention is a norbornene type monomer represented by the above-mentioned formula (5). Preferred cycloolefin monomers may be, for example, norbornene type monomers represented by the formula (6)

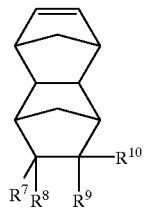

(6)

wherein $R^7$–$R^{10}$ are the same as defined in the formula (3), and the formula (7)

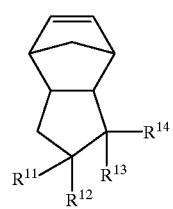

(7)

wherein $R^{11}$–$R^{14}$ are the same as defined in the formula (3).

Specific examples of such cycloolefin monomers which can be used include known monomers disclosed in JP-A-2-227424, JP-A-2-276842, JP-A-5-97719, JP-A-7-41550 and JP-A-8-72210. Specifically, the following cycloolefin monomers may be mentioned as examples:

bicyclo[2.2.1]hept-2-ene derivatives, tetracyclo[4.4.0.$1^{2,5}.1^{7,10}$]-3-dodecene derivatives, hexachloro-[6.6.1.$1^{3,6}.1^{10,13}.0^{2,7}.0^{9,14}$]-4-heptadecene derivatives, octacyclo[8.8.0.$1^{2,9}.1^{4,7}.1^{11,18}.1^{13,16}.0^{3,8}.0^{12,17}$]-5-docosene derivatives, pentacyclo[6.6.1.$1^{3,6}.0^{2,7}.0^{9,14}$]-4-hexadecene derivatives, heptacyclo-5-eicosene derivatives, heptacyclo-5-heneicosene derivatives, tricyclo-[4.4.0.$1^{2,5}$]-3-decene derivatives, tricyclo[4.4.0.$1^{2,5}$]-3-undecene derivatives, pentacyclo[6.5.1.$1^{3,6}.0^{2,7}.0^{9,13}$]-4-pentadecene derivatives, pentacyclopentadecadiene derivatives, pentacyclo[7.4.0.$1^{2,5}.1^{9,12}.0^{8,13}$]-3-pentadecene derivatives, heptacyclo-[8.7.0.1$^{3,6}.1^{10,17}.1^{12,15}.0^{2,7}.0^{11,16}$]-4-eicosene derivatives, nonacyclo[10.9.1.$1^{4,7}.1^{13,20}.1^{15,18}.0^{3,8}.0^{2,10}.0^{12,21}.0^{14,19}$]-5-pentacosene derivatives, pentacyclo[8.4.0.$1^{2,5}.1^{9,12}.0^{8,13}$]-3-hexadecene derivatives, heptacyclo-[8.8.0.$1^{4,7}.1^{11,18}.1^{13,16}.0^{3,8}.0^{12,17}$]-5-heneicosene derivatives, nonacyclo-[10.10.1.$1^{5,8}.1^{14,21}.1^{16,19}.0^{2,11}.0^{4,9}.0^{13,22}.0^{15,20}$]-5-hexacosene derivatives, 1,4-methano-1,4,4a,9a-tetrahydrofluorene derivatives, 1,4-methano-1,4,4a,5,10,10,10a-hexahydroanthracene derivatives and cyclopentadiene-acenaphthylene adducts.

More specific examples include bicyclo[2.2.1]-hept-2-ene derivatives, such as bicyclo[2.2.1]hept-2-ene, 6-methylbicyclo[2.2.1]hept-2-ene, 5,6-dimethyl bicyclo [2.2.1]hept-2-ene, 1-methylbicyclo[2.2.1]hept-2-ene, 6-ethylbicyclo[2.2.1]hept-2-ene, 6-n-butylbicyclo-[2.2.1] hept-2-ene, 6-isobutylbicyclo[2.2.1]hept-2-ene and 7-methylbicyclo[2.2.1]hept-2-ene; tetracyclo[4.4.0.$1^{2,5}$. $1^{7,10}$]-3-dodecene derivatives, such as tetracyclo[4.4.0.$1^{2,5}$.$1^{7,10}$]-3-dodecene, 8-methyltetra cyclo[4.4.0.$1^{2,5}.1^{7,10}$]-3-dodecene, 8-ethyltetracyclo[4.4.0.$1^{2,5}.1^{7,10}$]-3-dodecene, 8-propyltetracyclo[4.4.0.$1^{2,5}.1^{7,10}$]-3-dodecene, 8-butyltetracyclo[4.4.0.$1^{2,5}.1^{7,10}$]-3-dodecene, 8-isobutyltetracyclo[4.4.0.$1^{2,5}.1^{7,10}$]-3-dodecene, 8-hexyltetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-stearyltetracyclo[4.4.0.1$^{2,5}$.1$^{7,10}$]-3-dodecene, 5,10-dimethyltetracyclo[4.4.0.1$^{2,5}$.1$^{7,10}$]-3-dodecene, 2,10-dimethyltetracyclo[4.4.0.1$^{2,5}$.1$^{7,10}$]-3-dodecene, 8,9-dimethyltetracyclo[4.4.0.1$^{2,5}$.1$^{7,10}$]-3-dodecene, 8-ethyl-9-methyltetracyclo[4.4.0.1$^{2,5}$.1$^{7,10}$]-3-dodecene, 11,12-dimethyltetracyclo[4.4.0.1$^{2,5}$.1$^{7,10}$]-3-dodecene, 2,7,9-trimethyltetracyclo[4.4.0 1$^{2,5}$.1$^{7,10}$]-3-dodecene, 9-ethyl-2,7-dimethyltetracyclo[4.4.0.1$^{2,5}$.1$^{7,10}$]-3-dodecene, 9-isobutyl-2,7-dimethyltetracyclo[4.4.0.1$^{2,5}$.1$^{7,10}$]-3-dodecene, 9,11,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene, 9-isobutyl-11,12-dimethyltetracyclo[4.4.0.1$^{2,5}$.1$^{7,10}$]-3-dodecene, 5,8,9,10-tetramethyltetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-ethylidene-9-ethyltetracyclo[4.4.0.1$^{2,5}$.1$^{7,10}$]-3-dodecene, 8-ethylidene-9-isopropyltetracyclo[4.4.0.1$^{2,5}$.1$^{7,10}$]-3-dodecene, 8-ethylidene-9-butyltetracyclo[4.4.0.1$^{2,5}$.1$^{7,10}$]-3-dodecene, 8-n-propylidenetetracyclo[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropylidene-9-methyltetracyclo[4.4.0.1$^{2,5}$.1$^{7,10}$]-3-dodecene, 8-isopropylidene-9-ethyltetracyclo[4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-isopropylidene-9-butyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene, 8-fluorotetracyclo[4.4.0.1$^{2,5}$.1$^{7,10}$]-3-dodecene, and 8,9-dichlorotetracyclo[4.4.0.1$^{2,5}$.1$^{7,10}$]-3-dodecene; hexacyclo[6.6.1.1$^{3,6}$.1$^{10,13}$0$^{2,7}$.0$^{9,14}$]-4-heptadecene derivatives, such as hexacyclo[6.6.1.1$^{3,6}$.1$^{10,13}$.0$^{2,7}$.0$^{9,14}$]-4-heptadecene, 12-methylhexacyclo[6.6.1.1$^{3,6}$.1$^{10,13}$.0$^{2,7}$.0$^{9,14}$]-4-heptadecene, 12-ethylhexacyclo[6.6.1.1$^{3,6}$.1$^{10,13}$.0$^{2,7}$.0$^{9,14}$]-4-heptadecene, 12-isobutylhexacyclo[6.6.1.1$^{3,6}$.1$^{10,13}$.0$^{2,7}$.0$^{9,14}$]-4-heptadecene, and 1,6,10-trimethyl-12-isobutylhexacyclo[6.6.1.1$^{3,6}$.1$^{10,13}$.0$^{2,7}$.0$^{9,14}$]-4-heptadecene; octacyclo[8.8.0.1$^{2,9}$.1$^{4,7}$.1$^{11,18}$.1$^{13,16}$.0$^{3,8}$.0$^{12,17}$]-5-docosene derivatives, such as octaylco[8.8.0.1$^{2,9}$.1$^{4,7}$.1$^{11,18}$.1$^{13,16}$.0$^{3,8}$.0$^{12,17}$]-5-docosene, 15-methylloctacyclo[8.8.0.1$^{2,9}$.1$^{4,7}$.1$^{11,18}$.1$^{13,16}$.0$^{3,8}$.0$^{12,17}$]-5-docosene, and 15-ethyloctacyclo[8.8.0.1$^{2,9}$.1$^{4,7}$.1$^{11,18}$.1$^{13,16}$.0$^{3,8}$.0$^{12,17}$]-5-docosene; pentacyclo[6.6.1.1$^{3,6}$.0$^{2,7}$.0$^{9,14}$]-4-hexadecene derivatives, such as pentacyclo[6.6.1.1$^{3,6}$.0$^{2,7}$.0$^{9,14}$]-4-hexadecene, 1,3-dimethylpentacyclo[6.6.1.1$^{3,6}$.0$^{2,7}$.0$^{9,14}$]-4-hexadecene, 1,6-dimethylpentacyclo[6.6.1.1$^{3,6}$.0$^{2,7}$.0$^{9,14}$]-4-hexadecene, and 15,16-dimethylpentacyclo[6.6.1.1$^{3,6}$.0$^{2,7}$.0$^{9,14}$]-4-hexadecene; heptacyclo-5-eicosene derivatives or heptacyclo-5-heneicosene derivatives, such as heptacyclo[8.7.0.1$^{2,9}$.1$^{4,7}$.1$^{11,17}$.0$^{3,8}$.0$^{12,16}$]-5-eicosene and heptacyclo[8.8.0.1$^{2,9}$.1$^{4,7}$.1$^{11,18}$.0$^{3,8}$.0$^{12,17}$]-5-heneicosene; tricyclo[4.3.0.1$^{2,5}$]-3-decene derivatives, such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene; tricyclo[4.4.0.1$^{2,5}$]-3-undecene derivatives, such as tricyclo[4.4.0.1$^{2,5}$]-3-undecene and 10-methyltricyclo[4.4.0.1$^{2,5}$]-3-undecene; pentacyclo[6.5.1.1$^{3,6}$.0$^{2,7}$.0$^{9,13}$]-4-pentadecene derivatives, such a pentacyclo[6.5.1.1$^{3,6}$.0$^{2,7}$.0$^{9,13}$]-4-pentadecene, 1,3-dimethylpentacyclo[6.5.1.1$^{3,6}$.0$^{2,7}$.0$^{9,13}$]-4-pentadecene, 1,6-dimethylpentacyclo[6.5.1.1$^{3,6}$.0$^{2,7}$.0$^{9,13}$]-4-pentadecene, and 14,15-dimethylpentacyclo[6.5.1.1$^{3,6}$.0$^{2,7}$.0$^{9,13}$]-4-pentadecene; such diene compounds as pentacyclo[6.5.1.1$^{3,6}$.0$^{2,7}$.0$^{9,13}$]-4,10-pentadecadiene; pentacyclo[7.4.0.1$^{2,5}$.1$^{9,12}$.0$^{8,13}$]-3-pentadecene derivatives, such as pentacyclo[7.4.0.1$^{2,5}$.1$^{9,12}$.0$^{8,13}$]-3-pentadecene and methyl-substituted pentacyclo[7.4.0.1$^{2,5}$.1$^{9,12}$.0$^{8,13}$]-3-pentadecene; heptacyclo[8.7.0.1$^{3,6}$.1$^{10,17}$.1$^{12,15}$.0$^{2,7}$.0$^{11,16}$]-4-eicosene derivatives, such as heptacyclo[8.7.0.1$^{3,6}$.1$^{10,17}$.1$^{12,15}$.0$^{2,7}$.0$^{11,16}$]-4-eicosene and dimethyl-substituted heptacyclo[8.7.0.1$^{3,6}$.1$^{10,17}$.1$^{12,15}$.0$^{2,7}$.0$^{11,16}$]-4-eicosene; nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives, such as nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene and trimethyl-substituted nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene; pentacyclo[8.4.0.1$^{2,5}$.1$^{9,12}$.0$^{8,13}$]-3-hexadecene derivatives, such as pentacyclo[8.4.0.1$^{2,5}$.1$^{9,12}$.0$^{8,13}$]-3-hexadecene, 11-methylpentacyclo[8.4.0.1$^{2,5}$.1$^{9,12}$.0$^{8,13}$]-3-hexadecene, 11-ethylpentacyclo[8.4.0.1$^{2,5}$.1$^{9,12}$.0$^{8,13}$]-3-hexadecene, and 10,11-dimethyl-pentacyclo[8.4.0.1$^{2,5}$.1$^{9,12}$.0$^{8,13}$]-5-hexadecene; heptacyclo[8.8.0.1$^{4,7}$.1$^{11,18}$.1$^{13,16}$.0$^{3,8}$.0$^{12,17}$]-5-heneicosene derivatives, such as heptacyclo[8.8.0.1$^{4,7}$.1$^{11,18}$.1$^{13,16}$.0$^{3,8}$.0$^{12,17}$]-5-heneicosene, 15-methyl-heptacyclo[8.8.0.1$^{4,7}$.1$^{11,18}$.1$^{13,16}$.0$^{3,8}$.0$^{12,17}$]-5-heneicosene, and trimethyl-heptacyclo[8.8.0.1$^{4,7}$.1$^{11,18}$.1$^{13,16}$.0$^{3,8}$.0$^{12,17}$]-5-heneicosene; nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives, such as nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene; pentacyclo[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, dimethyl-substituted pentacyclo[6.5.1.1$^{3,6}$.0$^{2,7}$.0$^{9,13}$]-4,11-pentadecadiene, trimethyl-substituted pentacyclo[6.5.1.1$^{3,6}$.0$^{2,7}$.0$^{9,13}$]-4,11-pentadecadiene, trimethyl-substituted pentacyclo[4.7.0.1$^{2,5}$.0$^{8,13}$.1$^{9,12}$]-3-pentadecene, pentacyclo[4.7.0.1$^{2,5}$.0$^{8,13}$.1$^{9,12}$]-3,10-pentadecadiene, methyl-substituted pentacyclo[4.7.0.1$^{2,5}$.0$^{8,13}$.1$^{9,12}$]-3,10-pentadecadiene, dimethyl-substituted pentacyclo[4.7.0.1$^{2,5}$.0$^{8,13}$.1$^{9,12}$]-3,10-pentadecadiene, trimethyl-substituted pentacyclo[4.7.0.1$^{2,5}$.0$^{8,13}$.1$^{9,12}$]-3,10-pentadecadiene, methyl-substituted heptacyclo[7.8.0.1$^{3,6}$.0$^{2,7}$.1$^{10,17}$.0$^{11,16}$.1$^{12,15}$]-4-eicosene, trimethyl-substituted heptacyclo[7.8.0.1$^{3,6}$.0$^{2,7}$.1$^{10,17}$.0$^{11,16}$.1$^{12,15}$]-4-eicosene, tetramethyl-substituted heptacyclo[7.8.0.1$^{3,6}$.0$^{2,7}$.1$^{10,17}$.0$^{11,16}$.1$^{12,15}$]-4-eicosene, tricyclo[4.3.0.1$^{2,5}$]-3,7-decadiene (i.e., dicyclopentadiene), 2,3-dihydrodicyclopentadiene, 5-phenyl-bicyclo[2.2.1]hept-2-ene (i.e., 5-phenyl-2-norbornene), 5-methyl-5-phenyl-bicyclo[2.2.1]hept-2-ene, 5-benzyl-bicyclo[2.2.1]hept-2-ene, 5-tolyl-bicyclo[2.2.1.]hept-2-ene, 5-(ethylphenyl)-bicyclo[2.2.1]hept-2-ene, 5-(isopropylphenyl) -bicyclo[2.2.1]hept-2-ene, 8-phenyl-tetracyclo[4.4.0.1$^{2,5}$.1$^{7,10}$]-3-dodecene, 8-methyl-8-phenyl-tetracyclo[4.4.0.1$^{2,5}$.1$^{7,10}$]-3-dodecene, 8-benzyl-tetracyclo[4.4.0.1$^{2,5}$.1$^{7,10}$]-3-dodecene, 8-tolyl-tetracyclo[4.4.0.1$^{2,5}$.1$^{7,10}$]-dodecene, 8-(ethylphenyl)-tetracyclo[4.4.0.1$^{2,5}$.1$^{7,10}$]-3-dodecene, 8-(isopropylphenyl)-tetracyclo[[4.4.0.1$^{2,5}$.1$^{7,10}$]-3-dodecene, 8,9-diphenyl-tetracyclo[4.4.0.1$^{2,5}$.1$^{7,10}$]-3-dodecene, 8-(biphenyl)-tetracyclo[4.4.0.1$^{2,5}$.1$^{7,10}$]-3-dodecene, 8-(β-naphthyl)-tetracyclo[4.4.0.1$^{2,5}$.1$^{7,10}$]-3-dodecene, 8-(α-naphthyl)-tetracyclo[4.4.0.1$^{2,5}$.1$^{7,10}$]-3-dodecene, 8-(anthracenyl)-tetracyclo[4.4.0.1$^{2,5}$.1$^{7,10}$]-3-dodecene, 11-phenyl-hexacyclo[6.6.1.1$^{3,6}$.0$^{2,7}$.0$^{9,14}$]-4-heptadecene, 6-(α-naphthyl)-bicyclo[2.2.1]-hept-2-ene, 5-(anthracenyl)-bicyclo[2.2.1]-hept-2-ene, 5-(biphenyl)-bicyclo[2.2.1]-hept-2-ene, 5-(β-naphthyl)-bicyclo[2.2.1]-hept-2-ene, 5,6-diphenyl-bicyclo

[2.2.1]-hept-2-ene, 9-(2-norbornen-5-yl)-carbazole, 1,4-methano-1,4,4a,4b, 5,8,8a,9a-octahydrofluorenes; 1,4-methano-1,4,4a,9a-tetrahydrofluorenes, such as 1,4-methano-1,4,4a,9a-tetrahydrofluorene, 1,4-methano-8-methyl-1,4,4a,9a-tetrahydrofluorene, 1,4-methano-8-chloro-1,4,4a,9a-tetrahydrofluorene and 1,4-methano-8-bromo-1,4,4a,9a-tetrahydrofluorene; 1,4-methano-1,4,4a,9a-tetrahydrodibenzofurans; 1,4-methano-1,4,4a,9a-tetrahydrocarbazoles, such as 1,4-methano-1,4,4a,9a-tetrahydrocarbazole and 1,4-methano-9-phenyl-1,4,4a,9a-tetrahydrocarbazole; 1,4-methano-1,4,4a,5,10,10a-hexahydroanthracenes, such as 1,4-methano-1,4-4a,5,10,10a-hexahydroanthracene; 7,10-methano-6b,7,10,10a-tetrahydrofluoranthenes; compounds obtained by further adding cyclopentadiene to cyclopentadiene-acenaphthaylene adducts, 11,12-benzo-pentacyclo[6.5.1.1$^{3,6}$.0$^{2,7}$.0$^{9,13}$]-4-pentadecene, 11,12-benzo-pentacyclo[6.6.1.1$^{3,6}$.0$^{2,7}$.0$^{9,14}$]-4-hexadecene, 14,15-benzo-heptacyclo[8.7.0.1$^{2,9}$.1$^{4,7}$.1$^{11,17}$.0$^{3,8}$.0$^{12,16}$]-5-eicosene and cyclopentadiene-acenaphthylene adducts.

These cycloolefin monomers may be used each alone or in a combination of two or more thereof.

(A-2) Method of Polymerization

The ring-opening polymer or the ring-opening copolymer of the cycloolefin monomer (norbornene type monomer) represented by the formula (5), preferably by the formula (6) and/or formula (7), may be obtained by known methods of polymerization.

The ring-opening polymerization catalyst which can be used may be, for example, a catalyst comprising a halide, nitrate or acetylacetonate of a metal selected from the group consisting of ruthenium, rhodium, palladium, osmium, iridium and platinum and a reducing agent; or a catalyst comprising a halide or acetylacetonate of a metal selected from the group consisting of titanium, vanadium, zirconium, tungsten and molybdenum and an organoaluminum compound.

The above-mentioned catalyst system may be incorporated with a third component to enhance selectivity in ring-opening polymerization and polymerization activity. The third component may be, for example, molecular oxygen, alcohols, ethers, peroxides, carboxylic acids, acid anhydrides, acid chlorides, esters, ketones, nitrogen-containing compounds, sulfur-containing compounds, halogen-containing compounds, molecular iodine, and other Lewis acids. The nitrogen-containing compounds are preferably aliphatic or aromatic tertiary amines, specific examples thereof including triethylamine, dimethylaniline, tri-n-butylamine, pyridine and α-picoline.

Though the ring-opening polymerization and copolymerization may be effected without using a solvent, they can also be conducted in an inert organic solvent. The solvent used may be, for example, aromatic hydrocarbons, such as benzene, toluene and xylene, aliphatic hydrocarbons, such as n-pentane, hexane and heptane, alicyclic hydrocarbons, such as cyclohexane, and halogenated hydrocarbons, such as styrene dichloride, dichloroethane, dichloroethylene, tetrachloroethane, chlorobenzene, dichlorobenzene and trichlorobenzene.

The polymerization temperature is usually −50° C. to 100° C., preferably −30° C. to 80° C., more preferably −20° C. to 60° C. The polymerization pressure is usually 0–50kg/cm$^2$, preferably 0–20kg/cm$^2$.

The ring-opening polymer of the cycloolefin monomer represented by the formula (5) is a polymer containing a repeating unit represented by the formula (8).

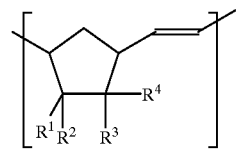

(8)

wherein the meanings of the respective symbols are the same as given in the formula (1).

The ring-opening polymer or copolymer of the cycloolefin monomers represented by the formula (6) and formula (7) is a polymer containing a repeating unit represented by the formula (9)

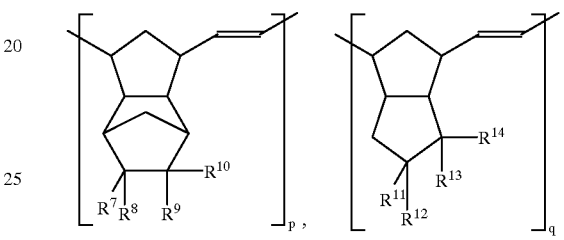

(9)

wherein the meanings of the respective symbols are the same as given in the formula (3).

(A-3) Hydrogenation

The cycloolefin-based polymer (i) of the present invention may be an unhydrogenated polymer containing the repeating unit represented by the formula (8), preferably by the formula (9), in which the carbon-carbon double bonds of the main chain remain unchanged; however, from the viewpoints of heat resistance and weather resistance, it is preferably a polymer in which at least the carbon-carbon double bonds of the main chain have been hydrogenated. Such hydrogenation products can be obtained by hydrogenating the ring-opening polymer or copolymer with hydrogen in the presence of a hydrogenation catalyst according to conventional methods.

The hydrogenation catalyst may be, for example, a catalyst comprising a combination of a transition metal compound with an alkyl metal compound, e.g., a combination of cobalt acetate with triethylaluminium, nickel acetylacetonate with triisobutylaluminium, titanocene dichloride with n-butyllithium, zirconocene dichloride with sec-butyllithium and tetrabutoxy tianate with dimethylmagnesium.

The hydrogenation is usually carried out in an inert organic solvent. The organic solvent is preferably a hydrocarbon type solvent, more preferably a cyclic hydrocarbon solvent, because of their excellent solubility for the hydrogenation product formed. Examples of such hydrocarbon type solvents include aromatic hydrocarbons, such as benzene and toluene, aliphatic hydrocarbons, such as n-pentane and hexane, alicyclic hydrocarbons, such as cyclohexane and decalin, and ethers, such as tetrahydrofuran and ethylene glycol dimethyl ether. The solvents may also be used as a mixture of two or more thereof. Usually, the solvent may be the same with the polymerization solvent, and the hydrogenation may be conducted with a mixture obtained by adding the hydrogenation catalyst to the polymerization liquid as it is.

The cycloolefin-based polymer (i) of the present invention desirably has a high heat resistance and high weather resistance. For this reason, it is desirable that usually 95% or more, preferably 98% or more, more preferably 99% or more of the unsaturated bonds in the main chain structure of the ring-opening polymer or copolymer are saturated. When a non-conjugated unsaturated bond, e.g., alkylidene group, is present in the side chain, it is hydrogenated at the same time with the hydrogenation of unsaturated bonds of the main chain. The aromatic ring in the side chain may be left unchanged, and thus partial hydrogenation is possible. The unsaturated bond in the main chain structure can be discriminated from the unsaturated bond in the aromatic ring structure by means of $^1$H-NMR analysis.

To hydrogenate mainly the unsaturated bond in the main chain structure, the hydrogenation is desirably carried out at a temperature of −20° C. to 120° C., preferably 0° C. to 100° C., more preferably 20° C. to 80° C. at a hydrogen pressure of 0.1–50 kg/cm$^2$, preferably 0.5–30 kg/cm$^2$, more preferably 1–20 kg/cm$^2$. To hydrogenate the aromatic ring, the hydrogenation is carried out, for example, at a higher temperature of about 150–250° C.

The hydrogenation product of the ring-opening polymer of the cycloolefin monomer represented by the formula (8) is a polymer in which the unsaturated bonds of the main chain have been hydrogenated and which contains a repeating unit represented by the formula (10)

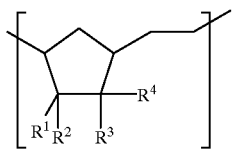

(10)

wherein the meanings of the respective symbols are the same as given in the formula (1).

The hydrogenation product of the ring-opening polymer of the cycloolefin monomer represented by the formula (9) is a polymer in which the unsaturated bonds in the main chain have been hydrogenated and which contains a repeating unit represented by the formula (11)

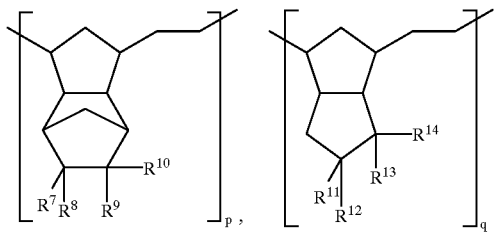

(11)

wherein the meanings of the respective symbols are the same as given in the formula (3).

(B) Cycloolefin-based Polymer (ii) Represented by the Formula (2)

The other cycloolefin-based polymer (ii) of the present invention represented by the formula (2), preferably the formula (4), is an addition polymer or copolymer of at least one cycloolefin monomer represented by the formula (5), preferably by the formula (6) and/or formula (7), or of the aforesaid cycloolefin monomer and a vinyl compound.

The vinyl compound is a compound represented by the formula (12)

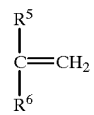

(12)

wherein $R^5$ and $R^6$ are the same as defined in the formula (2).

The vinyl compound may be, for example, ethylene or α-olefins having 2–20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene; cycloolefins, such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; non-conjugated dienes, such as 1,4-hexadiene, 4-methyl-1,4-hexadiene, 5-methyl-1,4-hexadiene and 1,7-octadiene; and aromatic vinyl compounds, such as styrene, α-methylstyrene, o-methylstyrene, p-methylstyrene, 1,3-dimethylstyrene and vinylnaphthalene. Most commonly used of these is ethylene. These vinyl compounds may be used each alone or in a combination of two or more thereof.

The addition copolymer of the cycloolefin monomer and the vinyl compound may be prepared by conventional methods. For example, the monomer components are copolymerized in a hydrocarbon solvent or in the absence of a solvent, in the presence of a catalyst comprising a vanadium compound soluble in the solvent or in the cycloolefin monomer and an organoaluminum compound, preferably a halogen-containing organoaluminum compound. The hydrocarbon solvent may be, for example, aliphatic hydrocarbons, such as hexane, heptane, octane and kerosene; alicyclic hydrocarbons, such as cyclohexane and methylcyclohexane; and aromatic hydrocarbons, such as benzene, toluene and xylene.

The polymerization temperature is usually −50° C. to 100° C., preferably −30° C. to 80° C., more preferably −20° C. to 60° C. The polymerization pressure is usually 0–50 kg/cm$^2$, preferably 0–20 kg/cm$^2$.

The cycloolefin-based polymer (ii) of the present invention may be modified, according to known methods as disclosed, for example, in JP-A-3-95235, by using α,β-unsaturated carboxylic acids, the derivatives thereof, styrene type hydrocarbons, organosilicon compounds having an olefinically unsaturated bond and a hydrolyzable group, unsaturated epoxy monomers, etc. Preferred modifiers are unsaturated carboxylic acids, such as maleic acid, or their derivatives, such as anhydrides and alkyl esters of the unsaturated carboxylic acids.

(C) Physical Properties

The content of the bound cycloolefin unit in the cycloolefin-based polymer of the present invention is not particularly limited and may be selected according to intended uses. Polymers with the content of usually 20% by weight, preferably 40% by weight or more, more preferably 60% by weight or more are preferable owing to their particularly excellent chemical resistance.

The cycloolefin-based polymer of the present invention has an intrinsic viscosity [η] determined in decalin at 80° C. in the range of 0.01–20 dl/g, preferably 0.1–10 dl/g, more preferably 0.2–5 dl/g, most preferably 0.3–1 dl/g. When the intrinsic viscosity [η] of the cycloolefin-based polymer is too low, the mechanical strength is insufficient (to keep the shape as molded bodies), whereas when it is too high the molding processability is insufficient.

The molecular weight distribution of the cycloolefin-based polymer of the present invention is not particularly limited, but the processability of the polymer is favorably enhanced to a great extent when the ratio of the weight average molecular weight (Mw) to the number average molecular weight (Mn) (Mw/Mn), calculated as polystyrene, determined by gel permeation chromatography (GPC) using toluene as the solvent is usually 4.0 or less, preferably 3.0 or less, more preferably 2.5 or less.

The glass transition temperature (Tg) of the cycloolefin-based polymer of the present invention may be selected according to intended uses. When the polymer is used as the molding material for carriers of silicon wafers, the preferable range of Tg is usually 30–300° C., preferably 50–250° C., more preferably 100–200° C.

(D) Foreign Matter

The cycloolefin-based polymer and the molding material of the present invention are characterized in that the number of foreign matter particles having a particle diameter of 0.5 μm or more present therein is not more than $3 \times 10^4$/g, preferably not more than $1 \times 10^4$/g, more preferably not more than $0.5 \times 10^4$/g. Although cycloolefin-based polymers which contain a reduced number of foreign matter particles having a particle diameter of 0.5 μm or more are disclosed, for example, in JP-A-3-57615, the number of foreign matter particles having a particle diameter of 0.5 μm or more in these polymers is at least about $6 \times 10^4$ and is unsatisfactory for preventing the generation of foreign matter particles in ultrasonic cleaning and other treating steps.

The content of foreign matters in the cycloolefin-based polymer can be determined with a microparticle detector by light scattering method. The foreign matters are usually in the form of particles, but the form is not limited thereto. The substances of the foreign matters include, besides the impurities which have entered from the outside, all that are incompatible with the cycloolefin-based polymer, e.g., catalyst residues, gels and side reaction products. Of these substances, those which have a particle diameter of 0.5 μm or more as determined with a microparticle detector by light scattering method are defined as the foreign matters in the present invention.

The method for producing the cycloolefin-based polymer with a low content of foreign matters having a particle diameter of 0.5 μm or more according to the present invention is not particularly limited and may be, for example, a method of subjecting a polymer-containing solution having the cycloolefin-based polymer dissolved therein to (1) at least two times of filtration with a mechanical filter having a pore diameter of 0.5 μm or less, preferably 0.3 μm or less or (2) filtration with a filter which has a capturing function based on electric charges. Of these methods, the method (2) which uses the filter having an electric charge-based capturing function is preferable because it has a high removing ability for minute foreign matters, can remove minute foreign matters which might pass through a mechanical filter based on sieve opening, and can prevent the regeneration of foreign matters which might be caused by reaggregation after filtration.

As the solution having the cycloolefin-based polymer dissolved therein, there may ordinarily used as it is a polymer-containing solution which has been obtained by polymerizing or copolymerizing the cycloolefin monomer or the cycloolefin monomer and a vinyl compound copolymerizable therewith, or alternatively a reaction liquid obtained by hydrogenation reaction. The total solids [TS] of the polymer-containing solution at the time of filtration is usually 1–40% by weight, preferably 5–35% by weight, more preferably 10–30% by weight. When the concentration is too low, a large amount of solvent needs to be treated, whereas when it is too high, the processability in filtration is lowered. Since the concentration of the solution after polymerization or after hydrogenation is usually about 10–25% by weight in the present invention, they may be subjected to filtration without being concentrated or diluted.

The filter having an electric charge-based capturing function refers to a filter which electrically captures and removes charged foreign matters. Usually, a filter medium to which electric charge has been given is used. Generally used is a zeta-potential filter which has a controlled zeta-potential.

The zeta-potential filter used in general is a filter in which a positive charge modifier has been applied to the filter medium, for example, a filter comprising cellulose fiber/silica/positive charge modifier (e.g., polyamine epichlorohydrin resin, aliphatic polyamine) as disclosed in Japanese national publication (Kohyo)-4-504379.

Other filter media which may be used include fiber filters or membrane filters made of polypropylene, polyethylene, PTFE, etc., fiber filters made of cellulose, filters made of glass fiber, filters made of inorganic substances, such as diatomaceous earth and filters made of metal fibers. Other positive charge modifiers include, for example, melamine-formaldehyde cationic colloid, inorganic cationic colloidal silica, etc. On the market, a positive charge modified filter is on sale by CUNO, Co., Ltd. under the trade name of "Zetaplus".

Filtration with a filter having an electric charge-based capturing function is not always satisfactory in filtering capacity, so that the filter is usually combined with a mechanical filter for the filtration. The order in such a combination is not particularly restricted but usually the filters are employed in the order of a mechanical filter and then a filter having an electric charge-based capturing function.

The mechanical filters are not particularly restricted so long as they are not adversely affected by solvents and may be, for example, fiber filters or membrane filters made of polypropylene, polyethylene, PTFE, etc., fiber filters made of cellulose, filters made of glass fiber, filters made of inorganic substances, such as diatomaceous earth, and filters made of metal fibers. The pore diameter of the mechanical filter is not particularly limited but it is usually 10 μm or less, preferably 5 μm or less, more preferably 1 μm or less. These mechanical filters may be used each alone or in a combination of two or more thereof.

When the filter having an electric charge-based capturing function is not used, filtering operation is repeated two times or more by using a mechanical filter having a pore diameter of 0.5 μm or less, preferably 0.3 μm or less, to attain the object of the present invention.

The filtrate after the filtration may be stripped of volatile components by heating under a reduced pressure in a closed system such that no foreign matter may enter from outside environment, and then cooled and pelletized in an environment of a high degree of cleanliness, e.g., in a clean room, and under strictly controlled conditions of a cleanliness of class 1000 or better, preferably class 100 or better.

(E) Molding Material

In the present invention, the cycloolefin-based polymer is used as a molding material. The molding material of the present invention may be incorporated with various compounding ingredients conventionally used in the field of the resin industry.

In the present invention, particularly by compounding a stabilizer, the stability of the molding material can be markedly improved and the generation of foreign matters at the time of chemical treatment and ultrasonic cleaning can be further reduced. The stabilizer may be, for example, phenolic antioxidants, phosphorus-containing antioxidants and sulfur-containing antioxidants. Of these stabilizers, preferred are phenolic antioxidants and particularly preferred are alkyl-substituted phenolic antioxidants.

The phenolic antioxidants may be known ones and include, for example, acrylate type compounds disclosed in JP-A-63-179953 and JP-A-1-168643, such as 2-t-butyl-6-(3-t-butyl-2-hydroxy-5-methylbenzyl)-4-methylphenyl acrylate and 2,4-di-t-amyl-6-(1-(3,5-di-t-amyl-2-hyroxyphenyl)ethyl)phenyl acrylate; alkyl-substituted phenol type compounds, such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol),4,4'-butylidene-bis(6-t-butyl-m-cresol),4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy-1,1-dimethylethyl)-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-(methylene-3-(3'-5'-di-t-butyl-4'-hydroxyphenyl)-propionate)methane [that is, pentaerythrityl-tetrakis[3-(3,5-di-t-butyl-4-hydroxyphenyl)propionate]], triethylene glycol bis(3-(3-t-butyl-4-hydroxy-5-methylphenyl)propionate) and tocopherol; and triazine group-containing phenol type compounds, such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine, and 2-octylthio-4,6-bis-(3,5-di-t-butyl-4-oxyanilino)-1,3,5-triazine.

The phosphorus-containing antioxidants may be any ones conventionally used in the resin industry and include, for example, monophosphite type compounds, such as triphenyl phosphite, diphenyl isodecyl phosphite, phenyl diisodecyl phosphite, tris(nonylphenyl)phosphite, tris(dinonylphenyl) phosphite, tris(2,4-di-t-butylphenyl)phosphite, tris(2-t-butyl-4-methylphenyl)phosphite, tris(cyclohexylphenyl) phosphite, 2,2'-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; and diphosphite type compounds, such as 4,4'-butylidene-bis(3-methyl-6-t-butylphenyl-di-tridecylphosphite), 4,4'-isopropylidene-bis(phenyl-di-alkyl($C_{12}$–$C_{15}$)phosphite), 4,4'-isopropylidene-bis(diphenylmonoalkyl($C_{12}$–$C_{15}$) phosphite), 1,1,3-tris(2-methyl-4-di-tridecylphosphite-5-t-butylphenyl)butane, tetrakis(2,4-di-t-butylphenyl)-4,4'-biphenylene diphosphite, cyclic-neopentanetetraylbis (octadecyl phosphite), cyclic-neopentanetetraylbis(isodecyl phosphite), cyclic-neopentantetraylbis(nonylphenyl phosphite), cyclic-neopentantetraylbis(2,4-di-t-butylphenyl phosphite), cyclic-neopentantetraylbis(2,4-dimethylphenyl phosphite) and cyclic-neopentantetraylbis(2,6-di-t-butylphenyl phosphite). Among these compounds, monophosphite type compounds are preferred, and tris (nonylphenyl)phosphite, tris(dinonylphenyl)phosphite and tris(2,4-di-t-butylphenyl)phosphite are particularly preferred.

The sulfur-containing antioxidants may be, for example, dilauryl 3,3'-thiodipropionate, dimyristyl 3,3'-thiodipropionate, distearyl 3,3'-thiodipropionate, lauryl stearyl 3,3'-thiodipropionate, pentaerythritol-tetrakis-(β-lauryl-thio-propionate), and 3,9-bis(2-dodecylthioethyl)-2,4,8-10-tetraoxaspiro[5,5]undecane.

These stabilizers may be used each alone or in a combination of two or more thereof. The amount of the stabilizer added may be properly selected according to intended uses. It is in the range of usually 0.001–10 parts by weight, preferably 0.05–5 parts by weight, more preferably 0.01–3 parts by weight relative to 100 parts by weight of the cycloolefin-based polymer.

Compounding ingredients other than described above include, for example, slipping agents, antiblocking agents, dies, pigments, lubricants, flame retardants, antistatic agents; fatty acid metal salts, such as zinc stearate, calcium stearate and calcium 1,2-hydroxystearate; and polyhydric alcohol fatty acid esters, such as glycerol monostearate, glycerol distearate, pentaerythritol distearate and pentaerythritol tristearate. These other ingredients may be used each alone or in a combination of two or more thereof. The amount of these other ingredients to be compounded may be selected as desired within limits not deleterious to the object of the present invention and within such a range that the number of foreign matter particles having a particle diameter of 0.5 μm or more may not exceed $3 \times 10^4$. It is preferable to use those other ingredients which do not have a particle diameter larger than 0.5 μm.

Though these compounding ingredients may be mixed with the cycloolefin-based polymer after isolation of the polymer, they are preferably added and mixed into a solution containing the polymer before filtration. Thus, a preferred process for producing the molding material incorporated with the compounding ingredients according to the present invention comprises, for example, dissolving the ingredient in the polymer-containing solution, then filtering the solution under the conditions described above, and then removing the solvent from the filtrate in an environment of a cleanliness of class 1000 or better.

(F) Molded Article

The molding material of the present invention can be molded into various molded articles by conventional molding methods, such as injection molding, press molding, extrusion and rotational molding. In particular, the molding material of the present invention can be injection-molded to produce various molded articles.

The molded article of the present invention is excellent in physical and chemical properties including transparency, heat resistance, water resistance, acid and alkali resistance, and moreover is featured by its very low content of foreign matters having a particle diameter of 0.5 μm or more. Therefore it is useful as various carriers, e.g., IC carriers, wafer carriers, information recording medium carriers, carrier tapes, and wafer shippers; lids of these carriers; ultrapure water equipment materials, such as ultrapure water containers and piping materials for ultrapure water; piping joints, containers for chemicals, and cleaning vessels.

The molded article of the present invention can also be used as optical recording media, e.g., optical disks, such as CD, CD-ROM, laser disks and digital video disks, optical cards and optical tapes; optical lenses, prisms, beam splitters, lens prisms, optical mirrors, optical fibers, LED sealants, liquid crystal display substrates, liquid crystal display films, optical guide plates for liquid crystal display, and optical film.

PREFERRED EMBODIMENTS OF THE INVENTION

The present invention is described in more detail below with reference to Referential Examples, Examples and Comparative Examples, but the invention is not limited to these Examples. In the following examples, the part and % are each by weight unless otherwise noted.

Referential Example 1

Twenty parts of 6-methyl-1,4:5,8-dimethano-1,4,4a,5,6,7,8,8a-octahydronaphthalene (hereinafter referred to as MTD) was dissolved in 300 parts of cyclohexane, and as a molecular weight controlling agent, 1 part of 1-hexene, 10 parts of a 15% cyclohexane solution of triethylaluminum and 3 parts of triethylamine were added thereto. The resulting solution was kept at 30° C., and 80 parts of MTD and 9 parts of a 20% cyclohexane solution of titanium tetrachloride were continuously added to the reaction system over a period of 2 hours to effect ring-opening polymerization.

After addition of the total amounts of MTD and titanium tetrachloride, 5 parts of a 0.8% cyclohexane solution of tungsten hexachloride was added to the reaction system at the point of time when the conversion of MTD to polymer was 82%, and the reaction system was further stirred for 30 minutes to continue polymerization. The conversion of MTD to polymer was 99%.

Referential Example 2

Ring-opening polymerization was carried out in the same manner as in Referential Example 1 except that the initially charged monomer was changed from 20 parts of MTD to 5 parts of MTD and 15 parts of dicyclopentadiene (hereinafter referred to as DCP), and the later charged monomer was changed from 80 parts of MTD to 20 parts of MTD and 60 parts of DCP.

The conversions of MTD and DCP to polymer were 99% and 99%, respectively.

EXAMPLE 1

To 100 parts of the ring-opening polymer solution obtained in Referential Example 1 were added 0.5 part of isopropyl alcohol and 0.5 part of water, and the resulting mixture was stirred at 80° C. for 1 hour. After completion of the reaction, 1.5 parts of anhydrous magnesium sulfate was added, the solution was cooled to 30° C. with stirring, and the resulting solution containing insoluble matters was pressure-filtered under a pressure of 2.5 kg/cm$^2$ by using a pressure filter (Hunda filter, mfd. by Ishikawajima-Harima Heavy Industries Co., Ltd.) with diatomaceous earth (Radiolite #800, mfd. by Showa Chemical Industry Co., Ltd.) as the filter layer, to obtain a clear ring-opening polymer solution.

Then, 1 part of a nickel-alumina catalyst (mfd. by NIKKI CHEMICAL Co., Ltd.) was added as a hydrogenation catalyst to 100 parts of the ring-opening polymer solution obtained above, a pressure of 50 kg/cm$^2$ was applied thereto with hydrogen, the reaction mixture was heated up to 200° C. with stirring, and then allowed to react for 4 hours to synthesize the hydrogenated polymer of the ring-opening polymer.

The reaction liquid having a polymer content of about 23% and containing a heterogeneous hydrogenation catalyst was pressure-filtered in the same manner as described above under a pressure of 2.5 kg/cm$^2$ with diatomaceous earth (Radiolite #500, mfd. by Showa Chemical Industry Co., Ltd.) as the filter layer, to obtain a clear colorless solution (solution I).

To 100 parts of the solution (I) was added 0.02 part of pentaerythrityl-tetrakis[3-(3,5-di-t-butyl-4-hydroxyphenyl) propionate] as an antioxidant to form a solution, and the solution was filtered through a metal fiber filter (pore diameter 3 μm, mfd. by NICHIDAI Co., Ltd.) and a metal fiber filter (pore diameter 0.2 μm, mfd. by NICHIDAI Co., Ltd.) to remove foreign matters and to obtain a solution (II).

The solution (II) was treated with a cylindrical concentrator-drier (mfd. by Hitachi, Ltd.) to remove cyclohexane of the volatile component under operating conditions of a temperature of 270° C. and a pressure of 100 Torr in the first step and a temperature of 270° C. and a pressure of 5 Torr in the second step. In a clean room of class 100, the polymer in the molten state was extruded through a die, then cooled with water and cut with a pelletizer (OSP-2, mfd. by NAGATA MFG. Co., Ltd.) to obtain 21 parts by pellets (polymer A).

The polymer A was filled and stored in a stainless steel closed container whose surface had been polished. The gas chromatographic analysis of a 10% toluene solution of the molding material A showed that the amount of residual cyclohexane was less than the measurable limit.

The polymer A was colorless and clear, and had an intrinsic viscosity [η] determined in decalin at 80° C. of 0.41 dl/g and Tg determined by DSC analysis of 150° C. The hydrogenation rate determined by means of $^1$H-NMR spectroanalysis with a solution of polymer A in deuterochloroform was about 100%. The molding material A was made into a solution of a concentration of 1.5% by using toluene purified by filtration through a 0.2 μm cartridge filter, and was measured for particle numbers of foreign matters having a particle diameter of 0.5 μm or more by using a micropartical detector by light scattering method (KS-58, mfd. by RION Co., Ltd.). The number was found to be 6.5×10$^3$/g. The ratio Mw/Mn, calculated as polystyrene, determined by GPC using toluene as the solvent was 2.1.

EXAMPLE 2

To 100 parts of the solution (I) obtained in Example 1 was added 0.02 part of pentaerythrityl-tetrakis[3-(3,5-di-t-butyl-4-hydroxyphenyl)propionate] as an antioxidant, to form a solution. The solution was filtered twice through the same filter with a pore diameter of 3 μm and with a pore diameter of 0.2 μm as used in Example 1 to remove foreign matters and to obtain a solution (III). From the solution (III), in the same manner as in Example 1, volatile components were removed and 19 parts of pellets (polymer B) were obtained.

The polymer B was filled and stored in a stainless steel closed container in the same manner as in Example 1. The polymer B was clear and colorless. Analyses made in the same manner as in Example 1 showed that the amount of residual cyclohexane was less than the measurable limit, the intrinsic viscosity [η] was 0.41 dl/g, Tg was 150° C., Mw/Mn was 2.1 and the number of foreign matter particles having a particle diameter of 0.5 μm or more was 3.1×10$^3$/g.

EXAMPLE 3

To 100 parts of the solution (I) obtained in Example 1 was added 0.02 part of pentaerythrityl-tetrakis[3-(3,5-di-t-butyl-4-hydroxyphenyl)propionate] as an antioxidant, to form a solution. The solution was filtered through the same filter with a pore diameter of 3 μm as used in Example 1, then through a Zetaplus filter 30S (pore diameter 0.5–1 μm, mfd. by CUNO Co., Ltd.) and further through the same filter with a pore diameter of 0.2 μm as used in Example 1, to remove foreign matters and to obtain a solution (IV). From the solution (IV), in the same manner as in Example 1, volatile components were removed and 20 parts of pellets (polymer C) were obtained.

The polymer C was clear and colorless. Analyses made in the same manner as in Example 1 showed that the amount of residual cyclohexane was less than the measurable limit, the intrinsic viscosity [η] was 0.41 dl/g, Tg was 150° C., Mw/Mn was 2.1 and the number of foreign matter particles having a particle diameter of 0.5 μm or more was $2.0 \times 10^3$/g.

EXAMPLE 4

The procedures of Example 1 were repeated except that the polymer was filled and stored in a paper bag having a polyethylene inner bag in place of the stainless steel closed container, to obtain 18 parts of pellets (polymer D). Analyses made in the same manner as in Example 1 showed that the amount of residual cyclohexane was less than the measurable limit, the intrinsic viscosity [η] was 0.41 dl/g, Tg was 150° C., Mw/Mn was 2.1 and the number of foreign matter particles having a particle diameter of 0.5 μm or more was $2.5 \times 10^4$/g.

EXAMPLE 5

One hundred parts of the ring-opening polymer solution obtained in Referential Example 2 was hydrogenated in the same manner as in Example 1 to obtain a clear colorless hydrogenated ring-opening polymer solution (solution V). To 100 parts of the solution (V) was added 0.02 part of pentaerythrityl-tetrakis[3-(3,5-di-t-butyl-4-hydroxyphenyl) propionate] as an antioxidant, to form a solution. The solution was treated in the same manner as in Example 3 to remove the volatile components and to obtain 19 parts of pellets (polymer E).

The polymer E was filled and stored in a stainless steel closed container in the same manner as in Example 1. The polymer E was clear and colorless. Analyses made in the same manner as in Example 1 showed that the amount of residual cyclohexane was less than the measurable limit, the intrinsic viscosity [η] was 0.45 dl/g, Tg was 106° C., Mw/Mn was 2.0 and the number of foreign matter particles having a particle diameter of 0.5 μm or more was $1.9 \times 10^3$.

Comparative Example 1

To 100 parts of the solution (I) obtained in Example 1 was added 0.02 part of pentaerythrityl-tetrakis[3-(3,5-di-t-butyl-4-hydroxyphenyl)propionate] as an antioxidant, to form a solution. The solution was filtered through the same filter with a pore diameter of 3 μm as used in Example 1 and then through a metal fiber filter (pore diameter 0.5 μm, mfd. by NICHIDAI Co., Ltd.), to remove the foreign matters and to obtain a solution (VI). The solution (VI) was treated in the same manner as in Example 1 to remove the volatile components and to obtain 20 parts of pellets (polymer F).

The polymer F was filled and stored in a paper bag having a polyethylene inner bag in the same manner as in Example 4. The polymer F was clear and colorless. Analyses made in the same manner as in Example 1 showed that the amount of residual cyclohexane was less than the measurable limit, the intrinsic viscosity [η] was 0.41 dl/g, Tg was 150° C. and the number of foreign matter particles having a particle diameter of 0.5 μm or more was $6.3 \times 10^4$/g.

EXAMPLE 6

By using the polymer A obtained in Example 1 as the molding material, a container having a length of 150 mm and a width of 130 mm at the top, a length of 145 mm and a width of 120 mm at the bottom, and a depth of 130 mm was molded with an injection molding machine (DISK5, mfd. by SUMITOMO HEAVY INDUSTRIES, Ltd.) which had been placed in a clean room of a cleanliness of class 1000 and whose die part had been held in an environment of a cleanliness of class 100 in a clean booth. The container obtained was degreased by washing with a 15% aqueous sodium hydroxide solution warmed at 60° C. and then washed thoroughly with water. Finally, the container was held in an environment of a degree of cleanliness of class 100 or better on a clean bench placed in a clean room of a degree of cleanliness of class 1000, and washed with distilled water purified by filtration through a 0.2 μm membrane filter.

In the container thus washed was placed 1.5 l of distilled water purified by filtration through the 0.2 μm membrane filter described above. Then, the water in the container was sampled, and the number of foreign matter particles having a particle diameter of 0.5 μm or more in 100 ml of the sample was determined 5 times with a microparticle detector by light scattering method (KS-58, mfd. by RION Co., Ltd.) to find numbers of 0–3/100 ml. Thereafter, 1.5 l distilled water purified by filtration through the 0.2 μm filter was again placed in the container and held for 5 minutes under cleaning conditions of an ultrasonic cleaner (UT-104, mfd. by Sharp Corp.) of 39 kHz and 100 W. The water in the container was sampled and the number of foreign matter particles having a particle diameter of 0.5 μm or more in 100 ml was determined 5 times in the same manner as described above, to find numbers of 0–4/100 ml.

EXAMPLES 7–9

By using the polymers B-E obtained in Examples 2–5, containers were molded and washed in the same manner as in Example 6. By using these containers, the quantity of foreign matters suspending in water was determined in the same as in Example 6. The results obtained are shown in Table 1.

Comparative Example 2

By using the polymer F obtained in Comparative Example 1, a container was molded and washed in the same manner as in Example 6. By using the container, the quantity of foreign matters suspending in water was determined in the same manner as in Example 6. The results obtained are shown in Table 1.

TABLE 1

| | Polymer | Number of foreign matter having particle diameter of 0.5 μm or more in molding material (particles/g) | Number of foreign matter having particle diameter of 0.5 μm or more in water in solution (particles/100 ml) | |
|---|---|---|---|---|
| | | | Before ultrasonic treatment | After ultrasonic treatment |
| Example 6 | A | $6.5 \times 10^3$ | 0–3 | 0–4 |
| Example 7 | B | $3.1 \times 10^3$ | 0–2 | 0–4 |
| Example 8 | C | $2.0 \times 10^3$ | 0–3 | 0–2 |
| Example 9 | D | $2.5 \times 10^4$ | 0–3 | 2–6 |
| Example 10 | E | $1.9 \times 10^3$ | 0–3 | 0–2 |
| Comparative Example 2 | F | $6.3 \times 10^4$ | 0–3 | 11–35 |

According to the present invention, there are provided a cycloolefin-based polymer with a very low content of foreign matters having a particle diameter of 0.5 μm or more, a molded article obtained by using the cycloolefin-based polymer, and a process for producing the cycloolefin-based polymer. The cycloolefin-based polymer of the present invention can be favorably used for producing various molded articles to be employed in fields where the presence or generation of minute foreign matters is very harmful or where a high degree of surface smoothness is required, for example, plastic cases employed as carriers of silicon wafers used in producing integrated circuits.

What is claimed is:

1. A molding material comprising a cycloolefin-based polymer which has an intrinsic viscosity [η] of 0.01 to 20 dl/g as determined in decalin at 80° C. and a content of foreign matters having a particle diameter of 0.5 μm or more of 3×10⁴ particles/g or less.

2. A molding material according to claim 1, in which the cycloolefin-based polymer has repeating unit represented by the formula (1) or the formula (2)

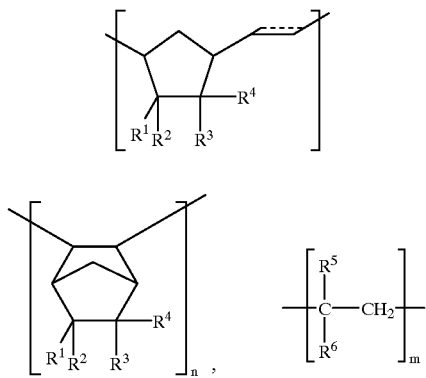

wherein
R¹–R⁴ each independently represent a hydrogen atom, hydrocarbon group, halogen atom, hydroxy group, ester group, alkoxy group, cyano group, amido group, imido group or silyl group or a hydrocarbon group substituted with a polar group, provided that two or more of R¹–R⁴ may combine with each other to form an unsaturated bond, single ring or multi-ring, the single ring or the multi-ring may have a double bond or may form an aromatic ring, and R¹ conjointly with R² or R³ conjointly with R⁴ may form alkylidene group;
R⁵ and R⁶ each independently represent a hydrogen atom, alkyl group or aryl group;
the symbol --- of a main chain represents a carbon-carbon single bond or double bond;
n and m are numbers specified by the mathematical expressions n+m=1, n=0.2–1 and m=0–0.8.

3. The molding material according to claim 1 wherein the repeating unit is represented by the formula (1).

4. The molding material according to claim 3 wherein 95% or more of the double bonds of the main chain represented by the --- is hydrogenated.

5. The molding material according to claim 1 wherein the content of foreign matters having a particle diameter of 0.5 μm is 1×10⁴ particles/g less.

6. The molding material according to claim 2 wherein the content of foreign matters having a particle diameter of 0.5 μm or more is 0.5×10⁴ particle/g or less.

7. A molded article obtained by molding the molding material according to claim 2.

8. The molded article according to claim 7 which is injected-molded article.

9. The molding material according to claim 2, which is prepared in an environment of a cleanliness of class 1000 or better.

10. The molded article according to claim 7, wherein the molding material is stored in a stainless steel closed container whose surface had been polished.

11. A molding material which comprises a cycloolefin-based polymer having a repeating unit represented by the formula (1).

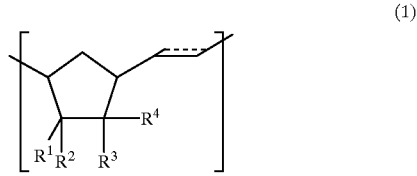

wherein
R¹–R⁴ each independently represent a hydrogen atom, hydrocarbon group, halogen atom, hydroxy group, ester group, alkoxy group, cyano group, amido group, imido group or silyl group or a hydrocarbon group substituted with a polar group, provided that two or more of R¹–R⁴ may combine with each other to form an unsaturated bond, single ring or multi-ring, the single ring or the multi-ring may have a double bond or may form an aromatic ring, and R¹ conjointly with R² or R³ conjointly with R⁴ may form an alkylidene group;
R⁵ and R⁶ each independent represent a hydrogen atom, alkyl group or any group;
the symbol --- of a main chain represents a carbon-carbon single bond or double bond;
n and m are numbers specified by the mathemtical expressions n+m=1, n=0.2–1 and m =0–0.8;
the cycloolefin-based polymer having viscosity (n) of 0.01–20 dl/g as determined in decalin at 80° C., and
said cycloolefin-based polymer is produced by filtering the cycloolefin-based polymer through an electrically charged filter so that a content of foreign matters having a particle diameter of 0.5 μm or more of 3×10⁴ particles/g or less.

12. The molding material according to claim 2 wherein the repeating unit is represented by the formula (2).

13. A process for producing a molding material according to claim 1, comprising the step of filtering a solution dissolved therein a cyloolefin-based polymer through a filter which has capturing function based on electric charges.

14. A process for producing a molding material according to claim 2, comprising the step of filtering a solution dissolved therein a cycloolefin-based polymer through a filter which has a capturing function based on electric charges.

15. The process according to claim 13, wherein a filtration is conducted at a total solid concentration, of the solution having the cycloolefin-based polymer dissolved therein of 1–40% by weight.

16. The process according to claim 13, wherein the filter which has a capturing function based on electric charges is a zeta-potential filter.

* * * * *